United States Patent [19]
La Claire

[11] 3,831,042
[45] Aug. 20, 1974

[54] TEMPERATURE COMPENSATION CIRCUIT FOR SENSOR OF PHYSICAL VARIABLES SUCH AS TEMPERATURE AND PRESSURE

[75] Inventor: Pal Andre La Claire, Claremont, Calif.

[73] Assignee: Bell & Howell Company, Chicago, Ill.

[22] Filed: Oct. 27, 1972

[21] Appl. No.: 301,606

[52] U.S. Cl......... 307/310, 73/362 AR, 73/362 SC, 219/501, 219/505, 307/308, 323/68
[51] Int. Cl...................... H03k 3/42, H03k 19/14
[58] Field of Search.................. 307/308, 310, 278; 219/491, 494, 501, 504, 505; 73/362 AR, 362 SC; 323/68

[56] References Cited
UNITED STATES PATENTS

| 3,022,457 | 2/1962 | Doan .................................. 323/68 |
| 3,067,613 | 12/1962 | Rasmussen....................... 73/362 A |
| 3,154,947 | 11/1964 | Poshadel et al................... 76/362 A |
| 3,299,346 | 1/1967 | Gambill .......................... 307/310 X |
| 3,440,883 | 4/1969 | Lightner.......................... 73/362 SC |
| 3,489,881 | 1/1970 | Chambers............................ 219/501 |
| 3,510,696 | 5/1970 | Bargen et al....................... 307/308 |

OTHER PUBLICATIONS
IBM Technical Disclosure Bulletin, by Bakke et al., Vol. 8, No. 9, Feb. 1966.

Primary Examiner—Andrew J. James
Attorney, Agent, or Firm—Christie, Parker & Hale

[57] ABSTRACT

A temperature compensating circuit for transducers, which have an overall negative temperature coefficient, employs a plurality of diodes connected in series with the transducer. The diodes are sensitive to changes in ambient temperature and provide discrete levels of temperature compensation. More precise compensation is provided by employing an adjustable voltage source in combination with a plurality of diodes.

6 Claims, 3 Drawing Figures

PATENTED AUG 20 1974 3,831,042

TEMPERATURE COMPENSATION CIRCUIT FOR SENSOR OF PHYSICAL VARIABLES SUCH AS TEMPERATURE AND PRESSURE

BACKGROUND OF THE INVENTION

1. Field of the Invention

This invention relates to a temperature compensation circuit which is particularly useful in compensating for changes in ambient temperature of pressure or temperature transducers. Transducers generally have a thermal response such that operation at a temperature other than that at which the transducer has been calibrated results in an error in the output of the transducer. For example, strain gages are often employed in a pressure transducer where the medium communicating with the gages is a liquid which has a temperature different from that at which the gages and resultant transducer were calibrated.

2. Description of the Prior Art

Various methods and apparatus have been employed in the past to compensate for the thermal responsiveness of transducers. For example, wire wound resistors employing low temperature coefficient wire, as close to zero coefficient as possible, have been employed. Additionally, where strain gages have a positive or negative temperature coefficient, a wire wound resistor having the same temperature coefficient and as close to the same thermal slope or resistance variation with respect to temperature as possible was connected in series with the gages. However, these wire wound resistors have a tendency to break due to the differences in thermal expansion rates of the resistors and the conformal coating used to hold them in place. Consequently these wire wound resistors tend to be unreliable. Alternatively, thermistors have been employed in compensation circuits but the thermistors exhibit a nonlinear temperature coefficient that is not compatible with the thermal slope of the transducers to be compensated. Moreover, the temperature compensation circuits are generally useful with only one specific transducer requiring a specific amount of compensation at a particular temperature which severely limits the usefulness of these compensation circuits.

SUMMARY OF THE INVENTION

The disadvantages of the wire wound resistor and thermistor type compensation circuits are overcome in accordance with this invention.

The compensation circuit of this invention comprises a plurality of diodes connected between the source of excitation voltage and the transducer. Many of the present semiconductor transducers designed for measuring pressure have an overall negative temperature coefficient which is compensated for by the negative temperature coefficient of the individual diodes. The number of diodes that are employed is selected to give an output voltage that is as nearly temperature independent as possible. Since the diodes provide compensation in discrete levels only, the source voltage may be varied so that the percent change in output voltage from the transducer caused by the diodes is the same as the percent change in output voltage due to the change in the sensitivity of the transducer with a change in temperature. As a consequence, transducers such as pressure transducers have an output that is related only to the physical variable being sensed.

BRIEF DESCRIPTION OF THE DRAWING

These and other features and advantages of the present invention may be understood more fully and clearly upon consideration of the following specification and the drawing, in which.

DESCRIPTION OF THE PREFERRED EMBODIMENT

Figure 1:
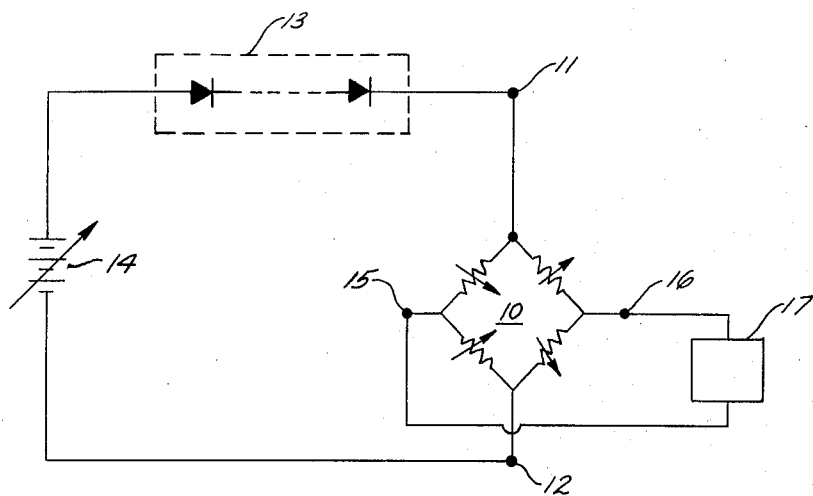
FIG. 1 is a schematic diagram partially in block form of a temperature compensated transducer in accordance with the present invention.

The temperature compensation circuit of the present invention is useful in compensating for variations in the output of the transducer due to variations in ambient temperature. The variations in the output due to variations in ambient temperature distort the output of the transducer and represent error signals. Compensation of a transducer by connecting the temperature compensation circuit of the present invention across the input of the sensing means of the transducer in series with the source is shown in FIG. 1 of the drawing.

A transducer means 10 has a pair of input terminals 11 and 12 across which a temperature compensating means 13 and a variable source of excitation voltage 14 are connected. The transducer means 10 has a pair of output terminals 15 and 16 to which a utilization means or recording means 17 is connected. The transducer means 10 is representative of sensors in general for monitoring changes in a physical variable such as temperature or pressure. The transducer means 10 depicted in the drawing shows a bridge circuit configuration of four elements or strain gages 18, 19, 20, and 21 and is representative of the typical semiconductor pressure sensor. In such a sensor, two of the elements are in compression while the other two elements are in tension, as represented by the arrows on the elements in the drawing.

In a semiconductor type transducer there are two characteristics that are temperature sensitive and which may cause an erroneous output voltage at temperatures other than the temperature at which the transducer is calibrated. These two characteristics are the gage factor of the transducer and the resistance of the transducer. In a semiconductor type transducer the gage factor has a negative temperature coefficient, that is, there is a decrease in the output signal for an increase in temperature. At the same time, the resistance has a positive temperature coefficient and causes an increase in the output signal for an increase in temperature. Generally, the gage factor predominates so that the semiconductor type transducer has an overall negative temperature coefficient.

A simple effective and relatively inexpensive way of compensating for this negative temperature coefficient in accordance with this invention is to employ one or more diodes in series with the transducer. The current $I_T$ through a diode as a function of temperature is given by the following equation:

$$I_T = I_{sat.}(1 - \epsilon^{qV_a/KT}) \text{ amperes per square centimeter}$$

where $I_{sat.}$ = reverse saturation current $Va$ = voltage drop across diode junction
$q$ = electron charge
$k$ = Boltzmann's constant
$T$ = temperature of the diode The equation may be written $$I_T = I_{sat.} - I_{sat.}\epsilon^{qVa/kT}$$

At room temperature the reverse saturation current is small compared to the exponential term in the forward direction and therefore the $I_{sat.}$ term can be ignored. Then if $I_T$ is a constant $$I_T = K = I_{sat.}\ \epsilon^{qVa/kT} \quad (2)$$

For this to be true the exponent has to be a constant also.

$$qVa/kT = M \quad (3)$$

Then, $$Va = (Mk/q)\ T \quad (4)$$

From this equation it is seen that the voltage drop across the junction of the diode under constant current condition in the range where $I_{sat.}$ is small is directly proportional to the absolute temperature.

Since $Va$ is the total voltage across the junction it is equal to the gap voltage $Vg$ minus the applied voltage $V_B$. Thus, $$V_B = Vg - Va = Vg - (Mk/q)T \quad (5)$$

Figure 2:
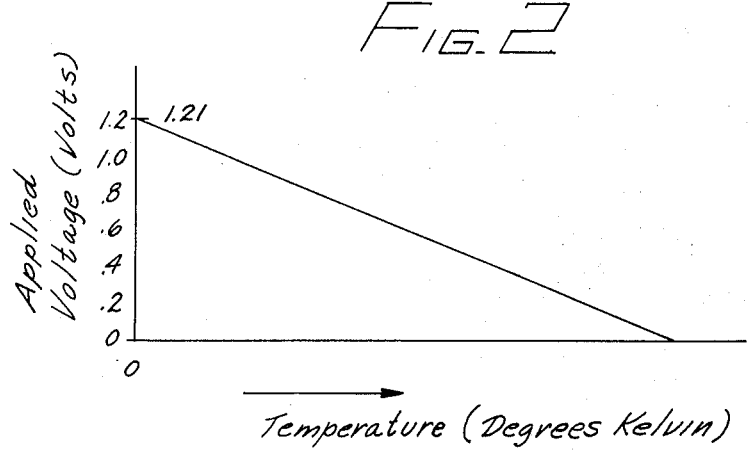
FIG. 2 is a chart of diode junction voltage versus temperature.

It is known that for certain semiconductor diodes at 0°K the gap voltage, $Vg$, equals 1.21 volts so that a plot of the applied voltage versus temperature follows the curve shown in FIG. 2.

It is seen from FIG. 2 that the variation in diode gap voltage with temperature is a linear function with negative slope. As a consequence, diodes may be employed to effect the thermal compensation of semiconductor transducers.

For a four element bridge transducer 10 as shown in FIG. 1 the output voltage, $e_o$, is given by the following equation:

$$e_o = E_{in}\ GSN/4 = E_{in}\ GS \quad (6)$$

where
$E_{in}$ = input voltage across terminals 11 and 12
$G$ = gage factor of the transducer
$S$ = strain By taking the log of terms and the derivative of the output voltage $e_o$, the percentage out is derived as follows:

$$\log e_o = \log E_{in} + \log G + \log S$$
$$de_o/e_o = dE_{in}/E_{in} + dG/G + dS/S \quad (7)$$

In a typical semiconductor transducer the change in strain for a change in temperature is negligible so that $ds$ may be set equal to 0 for all temperatures. Then, $$de_o/e_o = dE_{in}/E_{in} + dG/G \quad (8)$$

To compensate the transducer bridge means to have $de_o = 0$ for all temperatures. As a result $$de_o/e_o = 0 = dE_{in}/E_{in} + dG/G$$

and $$dE_{in}/E_{in} = -dG/G \quad (9)$$

The percentage of the applied voltage must equal the negative percentage change of gage factor to have thermal sensitivity compensation.

Figure 3:
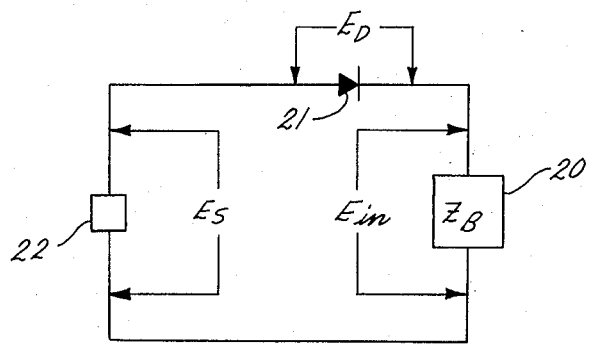
FIG. 3 is a diagram, partially in block form, of the circuit of FIG. 1.

A block and schematic diagram of the transducer and compensation circuit of FIG. 1 as shown in FIG. 3 where the box 20 represents the transducer 10, the single diode 21 represents all of the diodes in the compensation circuit and box 22 represents a source of excitation voltage for the transducer.

Considering this schematic block diagram of FIG. 3 for the transducer, and compensation circuit of FIG. 1 it is seen that $$E_S = E_D + E_{in} \quad (10)$$

where:
$E_S$ = source voltage
$E_{in}$ = the voltage applied to the transducer bridge
$E_D$ = the total voltage across all of the diodes Since the voltage drop, $Va$, across the junction of each diode is a linear function with negative slope and directly proportional to the absolute temperature, then the total diode voltage drop, $E_D$, is a linear function with negative slope and directly proportional to the absolute temperature. Hence, if $E_S$ is constant, then $E_{in}$ must increase at the same rate that $E_D$ decreases for any change in temperature or $dE_D = dE_{in}$. Thus, if $dE_D/E_{in}$ can be made equal to $dG/G$ exact compensation will be effected.

Typical semiconductor diodes have a thermal response of approximately 1 millivolt per degree Fahrenheit and typically have a forward voltage drop of 0.6 volts at room temperature or 72°F, which drop decreases with increase in temperature. A plurality of diodes may be required to provide the compensation for a transducer where the output voltage decreases more rapidly due to a change in gage factor than the increase in output voltage provided by the negative temperature coefficient of the diode between the source voltage and transducer.

Generally both the source voltage and the total voltage across the diodes as determined by the number of diodes have to be varied because the diodes provide only discrete steps of variation and therefore $E_D$ is variable only in steps. The number of diodes in the compensation circuit 13 is selected so that the percentage change in diode voltage is as nearly equal to the percentage change in applied voltage, $E_{in}$, due to change in temperature as possible.

If a variation in output voltage with a change in temperature still exists, then the source voltage may also be varied to complete the compensation. For this purpose source 14 is made variable and the source voltage may be selected in combination with the number of diodes to give the desired compensation.

Various changes or modifications may be made in the details of construction without departing from the spirit and scope of the invention as defined by the appended claims.

What is claimed is:

1. In combination,
a transducer for converting changes in a physical variable to an electrical signal,
the transducer having a negative temperature coefficient that causes an error in the output at temperatures other than that at which the transducer is calibrated,
a source of excitation voltage for the transducer, and
a compensation circuit of a plurality of diodes connected in the path of the excitation current to the transducer and between the source of excitation voltage and the transducer.

2. The combination in accordance with claim 1 wherein the transducer comprises a plurality of strain gages connected to sense variations in pressure.

3. The combination in accordance with claim 1 wherein the transducer comprises four strain gage elements connected in a bridge circuit configuration.

4. The combination in accordance with claim 1 further comprising a variable source of excitation voltage.

5. In combination,
a transducer having an overall negative temperature coefficient,
a source of variable voltage for providing excitation voltage for the transducer, and
a plurality of diodes connected in the path of excitation current to the transducer and between the source and the transducer, the number of diodes being of sufficient number to cause a greater increase in excitation voltage and output voltage from the transducer with an increase in temperature than the decrease in output voltage caused by the negative temperature coefficient of the transducer.

6. A temperature compensated pressure sensor comprising a semiconductor transducer having four elements connected in a bridge circuit configuration with an overall negative temperature coefficient,
a source of excitation voltage for the transducer, and
a plurality of diodes connected in the path of excitation current to the transducer and between the source and the transducer.

* * * * *

UNITED STATES PATENT OFFICE
CERTIFICATE OF CORRECTION

Patent No. 3,831,042　　　　　　Dated August 20, 1974

Inventor(s): Pal Andre La Claire

It is certified that error appears in the above-identified patent and that said Letters Patent are hereby corrected as shown below:

Col. 4, line 18, "as" should be --is--;

Col. 4, line 19, "20" should be --30--;

Col. 4, line 20, "21" should be --31--;

Col. 4, line 21, "22" should be --32--.

Fig. 3 - the reference numerals "20", "21", and "22" should be --30--, --31--, and --32--, respectively.

Signed and sealed this 28th day of January 1975.

(SEAL)
Attest:

McCOY M. GIBSON, JR.　　　　　　C. MARSHALL DANN
Attesting Officer　　　　　　　　Commissioner of Patents